United States Patent [19]

Catto et al.

[11] 3,768,753

[45] Oct. 30, 1973

[54] TAPE CARTRIDGE

[75] Inventors: Kenneth A. Catto, Portland; Harold R. Burt, Beaverton, both of Oreg.

[73] Assignee: Data Time, Inc., Beaverton, Oreg.

[22] Filed: Mar. 31, 1972

[21] Appl. No.: 240,156

[52] U.S. Cl..................... 242/197, 242/71.1, 352/78

[51] Int. Cl........................................... G11b 23/10

[58] Field of Search.................... 242/197, 198, 199, 242/200, 194, 210, 71.1, 71.2; 274/4 B, 4 C, 242/11 B, 11 C; 179/100.2 Z, 100.2 ZA; 352/72, 352/78

[56] References Cited

UNITED STATES PATENTS

| | | | |
|---|---|---|---|
| 3,090,574 | 5/1963 | Doncaster et al. | 242/71.1 X |
| 3,323,744 | 6/1967 | Chesley et al. | 242/71.1 |
| 3,620,475 | 11/1971 | Penn | 242/197 |

*Primary Examiner*—George F. Mautz
*Attorney*—Jon M. Dickinson et al.

[57] ABSTRACT

A tape cartridge comprising an upper housing member, a flanged bearing, and a lower disc rotatably mounted on the bearing. The upper housing member has a central spindle and a concentric wall portion both extending downwardly from the lower surface, the wall portion and the surface encompassed, thereby forming the outer lateral and upper boundaries, respectively, of a tape chamber. The disc has an apertured central hub portion extending upwardly from the upper surface, the outer surface of the hub portion and the upper disc surface forming the inner lateral and lower boundaries, respectively, of the tape chamber. The bearing provides the sole, low friction surface contact with the disc.

8 Claims, 9 Drawing Figures

TAPE CARTRIDGE

BACKGROUND OF THE INVENTION

1. Field of the Invention

This invention relates to tape cartridges, and more particularly to tape cartridges for storing magnetic recording tape.

2. Brief Description of the Prior Art

Several types of tape cartridge are known which are suitable for housing magnetic recording tape. Such cartridges have been designed for use with a wide variety of recording and reproducing devices, e.g., audio tape recorders, video tape recorders, office dictating machines, tape players, etc. Many known tape cartridges have been designed for use with a specific type of machine.

The increasing popularity and variety of recording and reproducing devices which utilize tape cartridges has created a demand for such a cartridge which is extremely inexpensive to manufacture and yet highly reliable, durable, and compatible with a wide variety of such devices.

SUMMARY OF THE INVENTION

The invention disclosed herein comprises a tape cartridge having an upper, one-piece housing member, a flanged bearing and a lower disc all held together by a single fastening member. The upper housing member has a central spindle and a concentric wall portion both extending downwardly from the lower surface, the wall portion and the surface encompassed thereby forming the outer lateral and upper boundaries, respectively, of a tape chamber. The disc has an apertured central hub portion extending upwardly from the upper surface, the outer surface of the hub portion and the upper disc surface forming the inner lateral and lower boundaries, respectively, of the tape chamber. The bearing provides the sole surface contact between the disc and the other elements comprising the tape cartridge. This arrangement provides a very low frictional force between the disc and the bearing which substantially reduces the force required to wind tape into the cartridge and withdraw tape from the cartridge.

The separate elements of the invention may be manufactured and assembled at an extremely low cost. Once assembled, the invention is highly insensitive to rough handling, extremely reliable in performance and compatible with a wide variety of recording and reproducing devices.

For a fuller understanding of the nature and advantages of the invention, reference should be had to the following detailed description, taken in conjunction with the accompanying drawings wherein like reference characters designate like or similar elements throughout the various views.

DESCRIPTION OF THE PREFERRED EMBODIMENT

Figure 1:
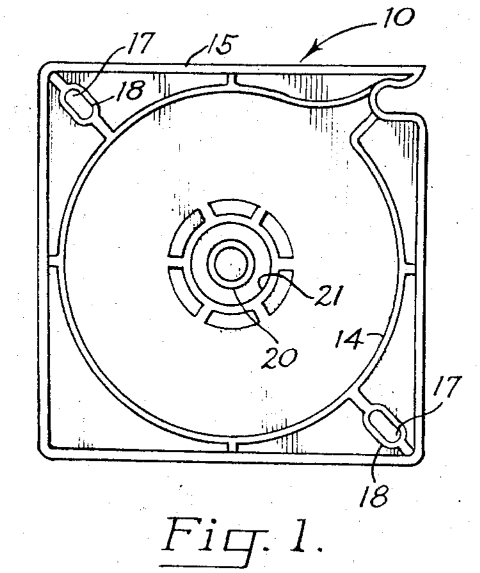
FIGS. 1, 2 and 3 are a bottom, front, and top elevational view, respectively, of the upper housing member of a preferred embodiment of the invention.
Figure 2:
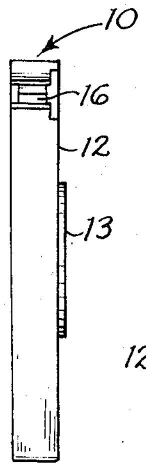
Figure 3:
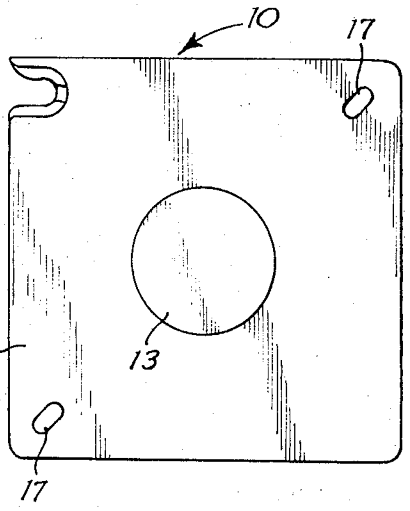

Turning now to the drawings, FIGS. 1 – 3 show a bottom, front, and top elevational view, respectively, of an upper housing member 10 of a preferred embodiment of the invention. Housing member 10 may be constructed of any suitable moldable material, such as a lightweight plastic material. Housing member 10 is generally rectangular in shape and has a substantially planar upper portion 12 with a substantially circular raised central portion 13. Central portion 13 provides additional thickness to upper portion 12 necessitated by an annular recess described below.

Depending from the underside of upper portion 12, is a first perimetral wall 14 which is substantially circular in shape. The inner surface of wall 14 provides the outer lateral boundary for the cartridge tape chamber. The surface area of the underside of upper portion 12 enclosed by perimetral wall 14 provides the upper boundary for the cartridge tape chamber. A second perimetral wall 15 extends downwardly from the underside of upper portion 12. Each wall is provided with an aperture 16 through which tape may be passed.

A pair of mounting apertures 17 are located at opposite corners of upper member 10 beyond the outer diameter of first perimetral wall 14. Each mounting aperture is provided with a downwardly extending reinforcing wall 18.

Depending from the underside of upper portion 12 is a hollow annular spindle 20, which provides an anchor point at the center of rotation of the tape cartridge. An annular recess having an outer wall 21 surrounds spindle 20.

Figure 4:
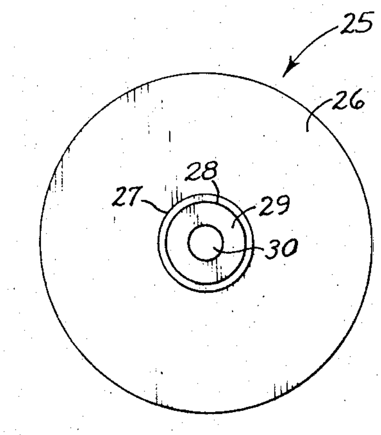
FIGS. 4, 5 and 6 are a top, side, and bottom elevational view, respectively, of the rotatable disc.
Figure 5:
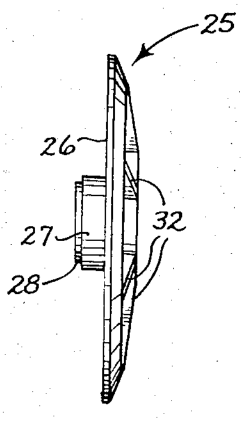
Figure 6:
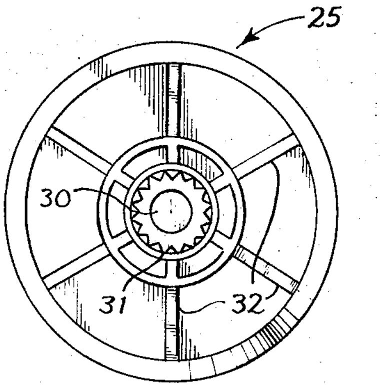

FIGS. 4 – 6 show a top, side, and bottom elevational view, respectively, of a rotatable disc portion of the tape cartridge. Circular disc 25, which may also be constructed of any suitable moldable material such as a lightweight plastic material, is provided with an upper surface 26 having a centrally located, upwardly extending hollow hub portion 27. As seen most clearly in FIG. 8, hub portion 27 has a circumferential notch 28 providing a cap portion 29 having a smaller outer diameter than the remainder of hub portion 27. Hub portion 27 is also provided with a centrally located mounting aperture 30. The outer wall surface of hub portion 27 and the upper surface 26 of disc 25 provide the inner lateral and lower boundaries, respectively, for the cartridge tape chamber.

The inner side of hub portion 27 is formed in the shape of an inner gear 31 adapted to be engaged by a suitable driving gear. The underside of disc 25 is provided with a number of tapered radial ribs 32 which prevent flexure of upper surface 26 when the cartridge is loaded with tape.

Figure 7:
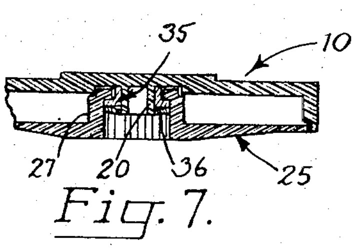
FIG. 7 is a fragmentary sectional elevational view of an assembled tape cartridge constructed according to the invention, the section being taken through the geometric center.
Figure 8:
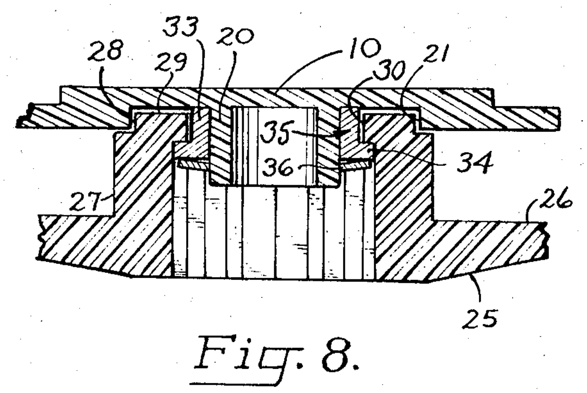
FIG. 8 is an enlarged sectional view of the FIG. 7 assembly.

As shown in FIGS. 7 and 8, in an assembled cartridge, disc 25 is rotatably suspended by a flanged bearing 35 having an upper annular body portion 33 and a lower flange portion 34, the latter having an outer diameter greater than the diameter of hub mounting aperture 30. The inner diameter of bearing 35 is selected to provide a snug fit with spindle 20 of upper housing member 10. Bearing 35 is constructed from any suitable bearing material, e.g., oilite, bronze, or Delrin.

Figure 9:
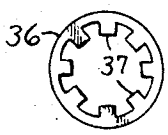
FIG. 9 is a plan view of a fastening element.

Bearing 35 is secured against rotation on spindle 20 by a spring clip 36 (FIG. 9) having a number of inwardly projecting fingers 37 of a sufficient length to be flexed when passed over the outer surface of spindle 20.

Mounting aperture 30 of disc 25 is dimensioned to provide a slight clearance with the outer surface of upper body portion 33 of bearing 35. The inner diameter of cap portion 29 of disc 25 is dimensioned to avoid any surface contact with the inner surface of outer wall 21 of the above-noted annular recess. The outer diameter of disc 25 is dimensioned to extend the periphery thereof beyond the inner surface of peripheral wall 14. The height of hub portion 27 of disc 25 is selected to provide a slight clearance between the rim portion of upper surface 26 and the bottom edge of peripheral wall 14

When assembled, disc 25 is mounted for rotation on bearing 35, the upper surface of flange 34 and the outer wall surface of upper body portion 33 providing the sole surface contact with disc 25. This arrangement has been found to provide an extremely low friction fit for disc 25, and a correspondingly small driving force is thus sufficient to rotate this member when in use.

As will now be evident, tape cartridges constructed according to the invention may be manufactured and assembled at an extremely low cost. Moreover, the above construction provides a tape cartridge which will withstand severe handling without adverse effects on the perforamance of the cartridge. In addition, cartridges constructed according to the invention may be used with a wide variety of recording and reproducing devices, it being only necessary to provide a pair of mounting posts compatible with mounting apertures 17 and a driving member engageable within inner gear 31 of disc 25. In certain applications, it may be desirable to fit spring clip into the recess in spindle 20 for releasably locking the cartridge onto a drive spindle.

While the foregoing provides a full disclosure of the preferred embodiment of the invention it is understood that various modifications, alternate constructions, and equivalents may be employed without departing from the true spirit and scope of the invention.

It is claimed and desired to secure by Letters Patent:

1. A tape cartridge comprising:

an upper housing member having a substantially planar surface and a downwardly extending substantially circular first perimetral wall integrally formed therewith, the portion of said planar surface circumscribed by said wall and inner surface of said wall forming the upper and outer lateral boundaries respectively of a tape chamber, said wall being provided with a first opening therein through which tape may be passed;

a downwardly extending spindle portion integrally formed with said substantially planar surface and substantially concentrically located within said chamber, said spindle portion having a substantially cylindrical outer surface;

an upwardly extending annular recess formed in said planar surface substantially concentrically about said spindle portion and within said chamber;

a flanged annular bearing nonrotatably mounted on said spindle portion and having substantially cylindrical upper and lower body portions, the outer diameter of said lower body portion along greater than the outer diameter of said upper body portion; and a disc rotatably mounted on said flanged bearing, said disc having a substantially circular periphery with a diameter greater than the inner diameter of said first perimetral wall, an upper surface having a substantially concentric upwardly extending substantially cylindrical hollow hub portion with an outer diameter slightly less than the outer diameter of said annular recess and an axial opening slightly greater than the outer diameter of said bearing upper body portion, said disc being mounted with the upper end of said hub portion thereof positioned within said annular recess in noncontacting relation therewith, said upper surface of said disc and the outer surface of said disc hub portion forming the lower and inner lateral boundaries respectively of said tape chamber;

said bearing providing a low friction support surface for said rotatable disc.

2. The apparatus of claim 1 wherein said upper housing member is provided with a plurality of mounting apertures in said planar surface thereof, said apertures being positioned externally of said tape chamber.

3. The apparatus of claim 2 wherein said apertures are positioned at diametrally opposed locations of said planar surface.

4. The apparatus of claim 1 wherein said upper housing member is provided with a downwardly extending second perimetral wall encompassing said first perimetral wall and having an opening therein adjacent said opening in said first perimetral wall through which tape may be passed.

5. The apparatus of claim 1 wherein the inner wall of said hollow hub portion is formed in the shape of an inner gear adapted to receive a suitable drive gear for rotating said disc.

6. The apparatus of claim 1 wherein the bottom surface of said disc is provided with a plurality of radially extending tapered ribs for preventing flexure of said discs.

7. The apparatus of claim 1 wherein the height of said hub portion is slightly greater than the depth of said first perimetral wall so that said bearing provides the sole surface contact with said disc.

8. The apparatus of claim 1 wherein said upper end of said hub portion is provided with a peripheral notch, the outer diameter of said notched portion being less than, and the outer diameter of the remainder of said hub surface being greater than, said outer diameter of said annular recess.

* * * * *